US011610084B1

(12) United States Patent
Daskalov et al.

(10) Patent No.: US 11,610,084 B1
(45) Date of Patent: Mar. 21, 2023

(54) APPARATUSES, METHODS, AND SYSTEMS FOR 3-CHANNEL DYNAMIC CONTEXTUAL SCRIPT RECOGNITION USING NEURAL NETWORK IMAGE ANALYTICS AND 4-TUPLE MACHINE LEARNING WITH ENHANCED TEMPLATES AND CONTEXT DATA

(71) Applicant: Hyper Labs, Inc., New York, NY (US)

(72) Inventors: Boris Nikolaev Daskalov, New York, NY (US); Daniel Biser Balchev, New York, NY (US)

(73) Assignee: Hyper Labs, Inc., New York, NY (US)

( * ) Notice: Subject to any disclaimer, the term of this patent is extended or adjusted under 35 U.S.C. 154(b) by 234 days.

(21) Appl. No.: 16/889,151

(22) Filed: Jun. 1, 2020

Related U.S. Application Data

(63) Continuation of application No. 16/674,324, filed on Nov. 5, 2019, now Pat. No. 10,671,892.

(60) Provisional application No. 62/827,153, filed on Mar. 31, 2019.

(51) Int. Cl.
*G06K 9/62* (2022.01)
*G06N 3/04* (2006.01)
*G06N 3/08* (2006.01)
*G06V 10/40* (2022.01)
*G06V 30/10* (2022.01)

(52) U.S. Cl.
CPC ......... *G06K 9/6262* (2013.01); *G06K 9/6256* (2013.01); *G06N 3/0445* (2013.01); *G06N 3/0454* (2013.01); *G06N 3/08* (2013.01); *G06V 10/40* (2022.01); *G06V 30/10* (2022.01)

(58) Field of Classification Search
CPC .. G06K 9/6262; G06K 9/6256; G06N 3/0445; G06N 3/0454; G06N 3/08; G06V 10/40; G06V 30/10
See application file for complete search history.

(56) References Cited

U.S. PATENT DOCUMENTS

| | | | |
|---|---|---|---|
| 6,603,881 B2 | 8/2003 | Perrone et al. |
| 7,219,085 B2 | 5/2007 | Buck et al. |
| 8,005,294 B2 | 8/2011 | Kundu et al. |
| 8,768,057 B2 | 7/2014 | Saund |
| 8,903,799 B2 | 12/2014 | Gruber |
| 8,913,285 B1 | 12/2014 | Neubrand |

(Continued)

*Primary Examiner* — Wesley J Tucker
(74) *Attorney, Agent, or Firm* — Cooley LLP

(57) ABSTRACT

In some embodiments, a method includes training a first machine learning model based on multiple documents and multiple templates associated with the multiple documents. The method further includes executing the first machine learning model to generate multiple relevancy masks, the multiple relevancy masks to remove a visual structure of the multiple templates from a visual structure of the multiple documents. The method further includes generating multiple multichannel field images to include the multiple relevancy masks and at least one of the multiple documents or the multiple templates. The method further includes training a second machine learning model based on the multiple multichannel field images and multiple non-native texts associated with the multiple documents. The method further includes executing the second machine learning model to generate multiple non-native texts from the multiple multichannel field images.

15 Claims, 5 Drawing Sheets

(56) References Cited

U.S. PATENT DOCUMENTS

| | | | |
|---|---|---|---|
| 9,043,349 | B1 | 5/2015 | Lin et al. |
| 9,129,340 | B1 * | 9/2015 | Medina, III ......... G06V 30/414 |
| 9,390,340 | B2 | 7/2016 | Lin et al. |
| 9,495,620 | B2 | 11/2016 | Dolfing et al. |
| 9,633,173 | B2 | 4/2017 | Pauletto et al. |
| 9,659,236 | B2 | 5/2017 | Barker et al. |
| 9,870,143 | B2 * | 1/2018 | Chiang ............... G06F 3/04883 |
| 9,881,208 | B2 | 1/2018 | Savchenkov et al. |
| 9,977,976 | B2 | 5/2018 | Yang et al. |
| 10,025,976 | B1 | 7/2018 | Sarraf et al. |
| 10,089,390 | B2 | 10/2018 | Ananthanarayanan et al. |
| 10,671,892 | B1 | 6/2020 | Daskalov et al. |
| 11,042,734 | B2 * | 6/2021 | Sarkar ....................... G06T 7/12 |
| 2005/0114799 | A1 | 5/2005 | Rossler et al. |
| 2011/0007366 | A1 | 1/2011 | Sarkar et al. |
| 2011/0007970 | A1 * | 1/2011 | Saund .................. G06V 30/155 |
| | | | 382/176 |
| 2014/0089302 | A1 | 3/2014 | Lapir et al. |
| 2017/0109625 | A1 | 4/2017 | Dai et al. |
| 2018/0114334 | A1 | 4/2018 | Desai et al. |
| 2018/0204111 | A1 | 7/2018 | Zadeh et al. |
| 2018/0329935 | A1 | 11/2018 | Mugali et al. |
| 2019/0340466 | A1 * | 11/2019 | Berseth ................ G06V 30/412 |
| 2020/0104710 | A1 * | 4/2020 | Vasudevan ............... G06N 3/08 |
| 2020/0302208 | A1 * | 9/2020 | Hoehne .................. G06V 30/40 |
| 2021/0097273 | A1 * | 4/2021 | Patwardhan ........... G06V 30/40 |
| 2021/0343030 | A1 * | 11/2021 | Sagonas ............... G06V 30/414 |
| 2021/0366099 | A1 * | 11/2021 | Liao ..................... G06T 7/0002 |

\* cited by examiner

Train setting – filled in form; masked form, and answer

APPARATUSES, METHODS, AND SYSTEMS FOR 3-CHANNEL DYNAMIC CONTEXTUAL SCRIPT RECOGNITION USING NEURAL NETWORK IMAGE ANALYTICS AND 4-TUPLE MACHINE LEARNING WITH ENHANCED TEMPLATES AND CONTEXT DATA

RELATED APPLICATIONS

This application is a Continuation of U.S. patent application Ser. No. 16/674,324, filed on Nov. 5, 2019 and titled "Apparatuses Methods and Systems for 3-Channel Dynamic Contextual Script Recognition Using Neural Network Image Analytics and 4-Tuple Machine Learning with Enhanced Templates and Context Data," which in turn claims priority to U.S. Provisional Patent Application No. 62/827,153, filed on Mar. 31, 2019 and titled "Apparatuses Methods and Systems for 3-Channel Dynamic Contextual Script Recognition Using Neural Network Image Analytics and 4-Tuple Machine Learning with Enhanced Templates and Context Data," the disclosures of each of which are incorporated herein by reference in their entireties.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Embodiments described herein generally relate to methods and systems for dynamically processing structured and semi-structured documents

BACKGROUND

Various forms of written communications have been used for thousands of years, and are still in use today.

SUMMARY

In some embodiments, a method includes training a first machine learning model based on multiple documents and multiple templates associated with the multiple documents. The method further includes executing the first machine learning model to generate multiple relevancy masks, the multiple relevancy masks to remove a visual structure of the multiple templates from a visual structure of the multiple documents. The method further includes generating multiple multichannel field images to include the multiple relevancy masks and at least one of the multiple documents or the multiple templates. The method further includes training a second machine learning model based on the multiple multichannel field images and multiple non-native texts associated with the multiple documents. The method further includes executing the second machine learning model to generate multiple non-native texts from the multiple multichannel field images.

Embodiments described herein generally relate to methods and systems for dynamically processing structured and semi-structured documents, an in particular, method, apparatuses, and systems that utilize a multichannel form template with masked context information to increase the efficiency and reliability of a machine learning handwriting recognition system that differentiates between essential and inconsequential areas of interest and consistently applies recognition to essential areas (hereinafter HPR). Methods and systems for 3-channel dynamic contextual script recognition using neural network image analytics and 4-tuple machine learning are disclosed. In some embodiments, the disclosure can provide script recognition that is vocabulary agnostic, grammar agnostic, and/or semantics agnostic, and can be used to process, for example, logographic, syllabic, alphabetic, abjadic, abugidic, featural, and/or ideographic scripts. Embodiments described herein include systems and methods utilizing multichannel form templates with masked context information to increase the efficiency and reliability of a machine learning handwriting recognition system that differentiates between essential and inconsequential areas of interest and consistently applies recognition to essential areas.

According to some embodiments of the HPR, systems of the disclosure can implement a multichannel image that allows a handwriting recognition system to add a machine learning visual component that recognizes background information/noise and determines what, if any, of the image can be safely disregarded before performing handwriting analysis. This eliminates the problem of both background noise being present in a field image and for handwritten elements that overflow bounded areas unpredictably. Such a HPR system improves computationally efficiency by combining template, handwriting, and mask into a single, multichannel image which can be used to train a machine learning algorithm in symbol recognition with the resulting output then able to be passed through a transcription component.

Other systems, processes, and features will become apparent upon examination of the following drawings and detailed description. It is intended that all such additional systems, processes, and features be included within this description, be within the scope of the present disclosure, and be protected by the accompanying claims. All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTION OF THE DRAWINGS

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

So that the manner in which the above recited features, advantages, and objects of the present disclosure are attained and can be understood in detail, a more particular description of the disclosure, briefly summarized above, can be had by reference to the embodiments illustrated in the appended drawings.

It is to be noted, however, that the appended drawings illustrate only example embodiments and are therefore not to be considered limiting of the scope of the disclosure, as the disclosure includes other equally effective embodiments.

Figure 1:
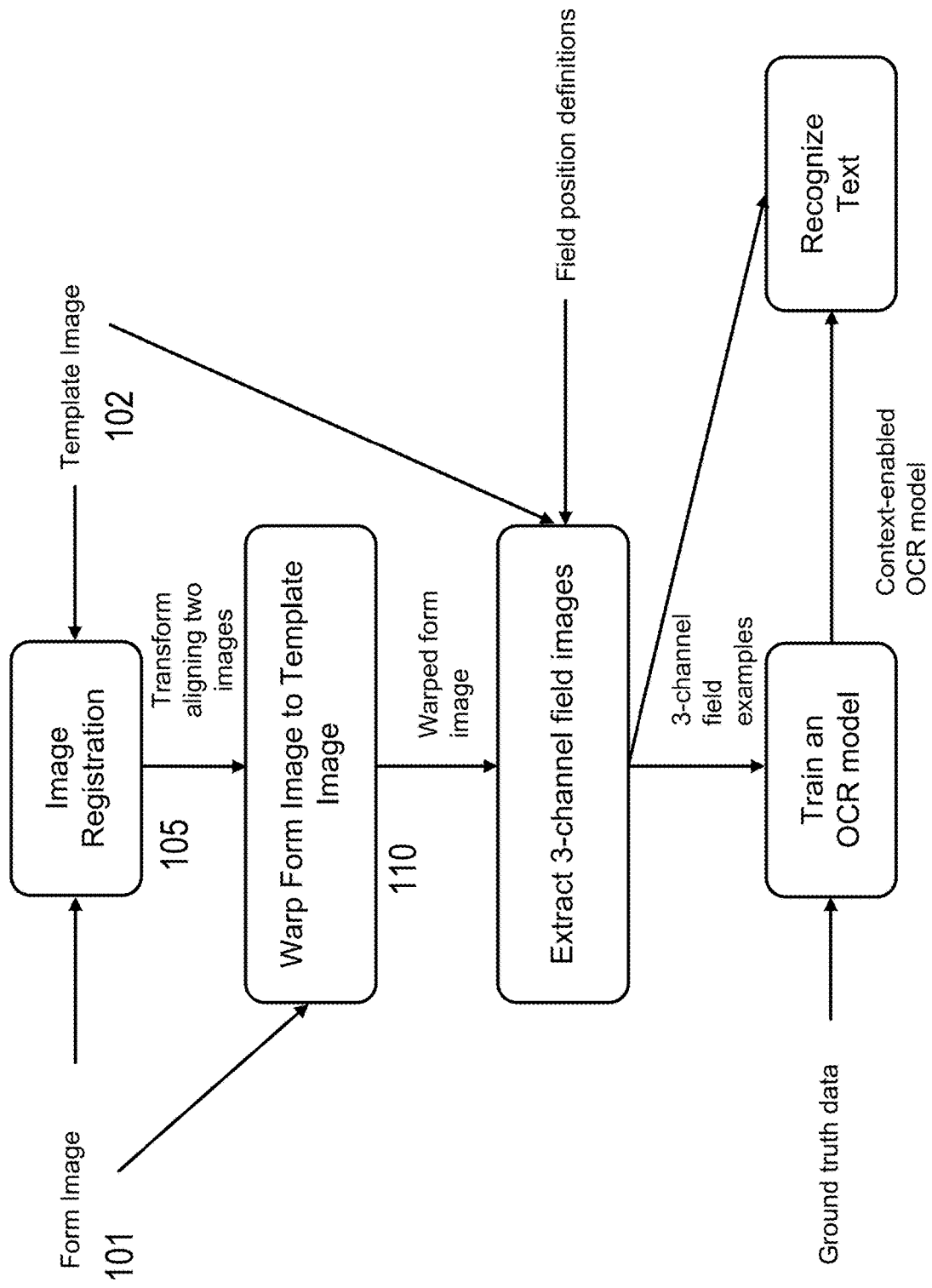

FIG. 1 illustrates a flowchart of the operation of an HPR recognition algorithm, according to an embodiment.

FIG. 2 illustrates the use of masking to identify areas of importance in the multichannel image, according to some embodiments.

FIG. 3 illustrates a training data set of a HPR handwriting recognition system, according to some embodiments.

Figure 4:
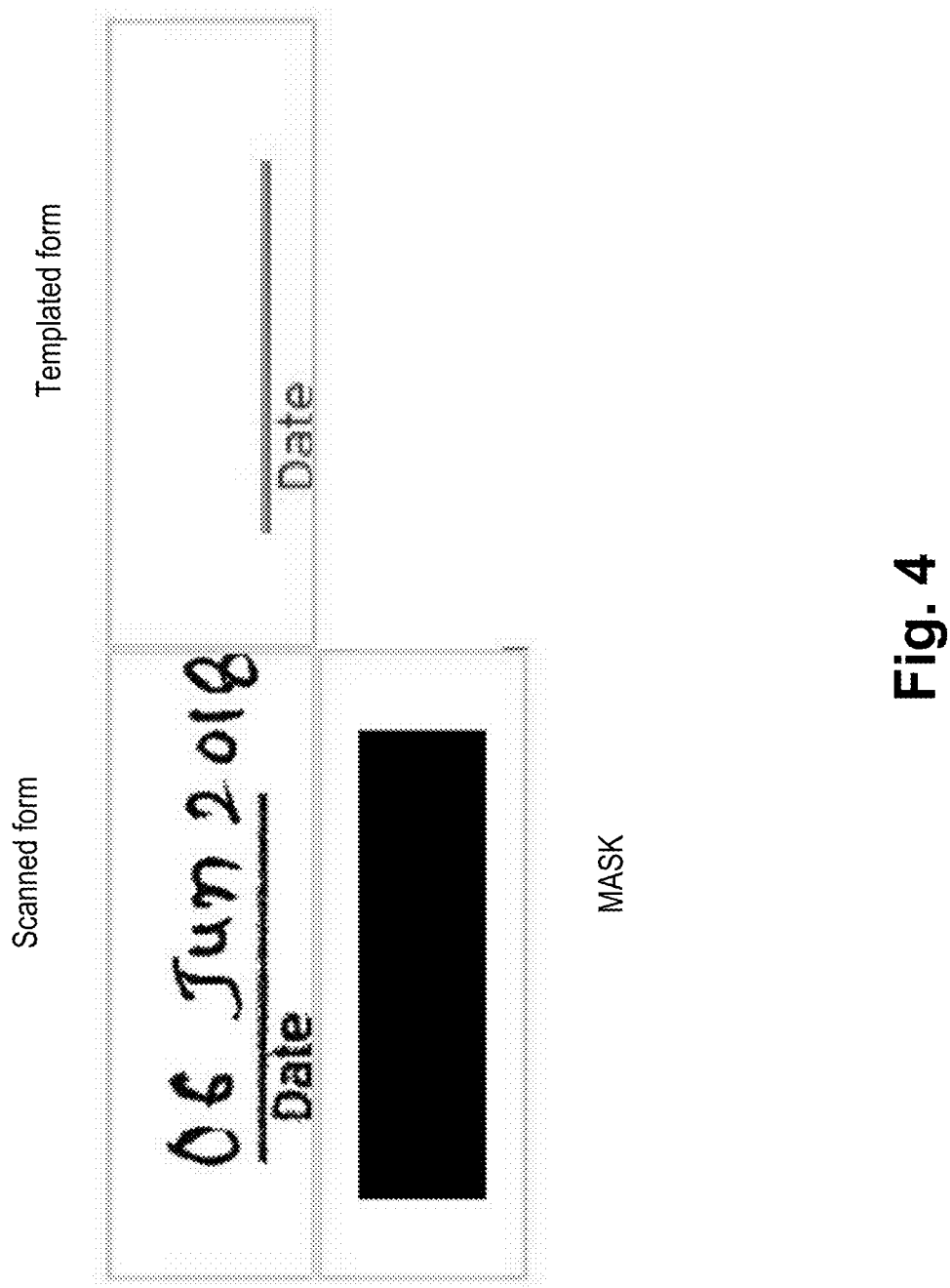

FIG. 4 illustrates how each image channel can be represented, according to some embodiments.

Figure 5:
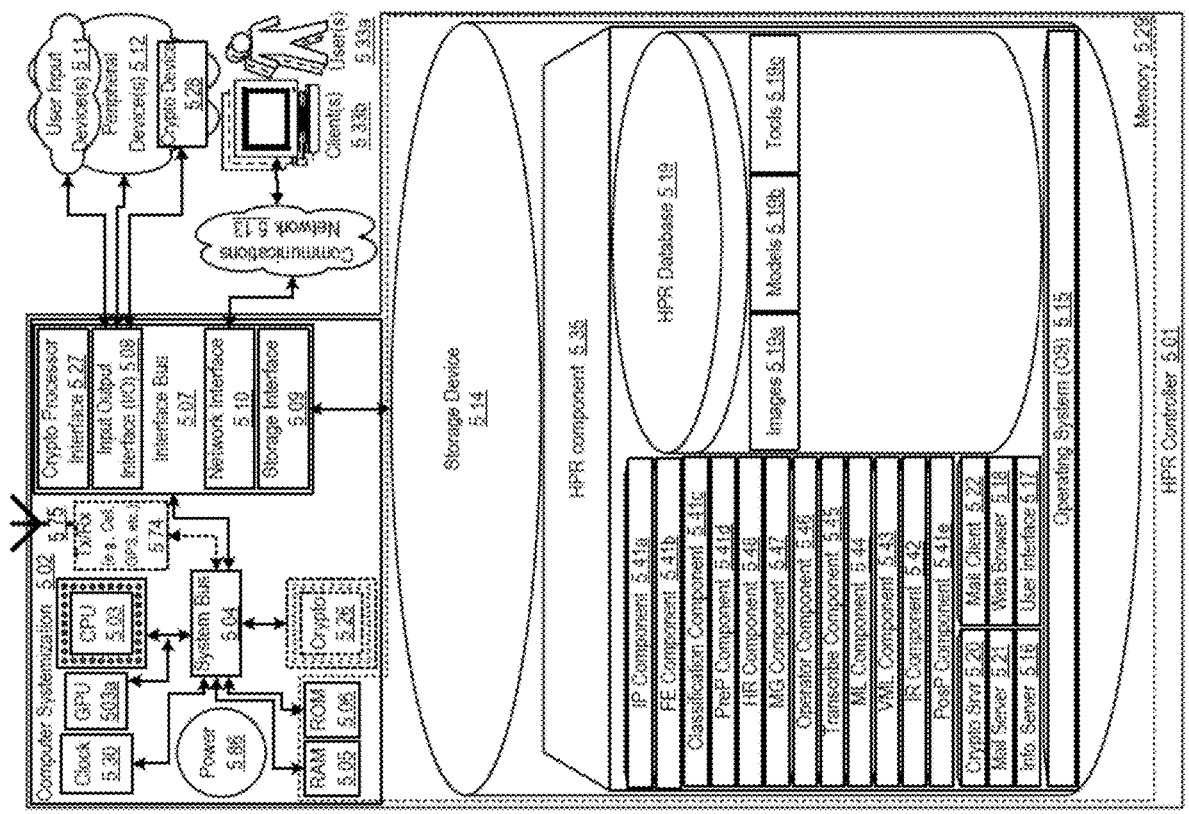

FIG. 5 is a block diagram illustrating embodiments of HPR controllers and systems.

Figure 6:
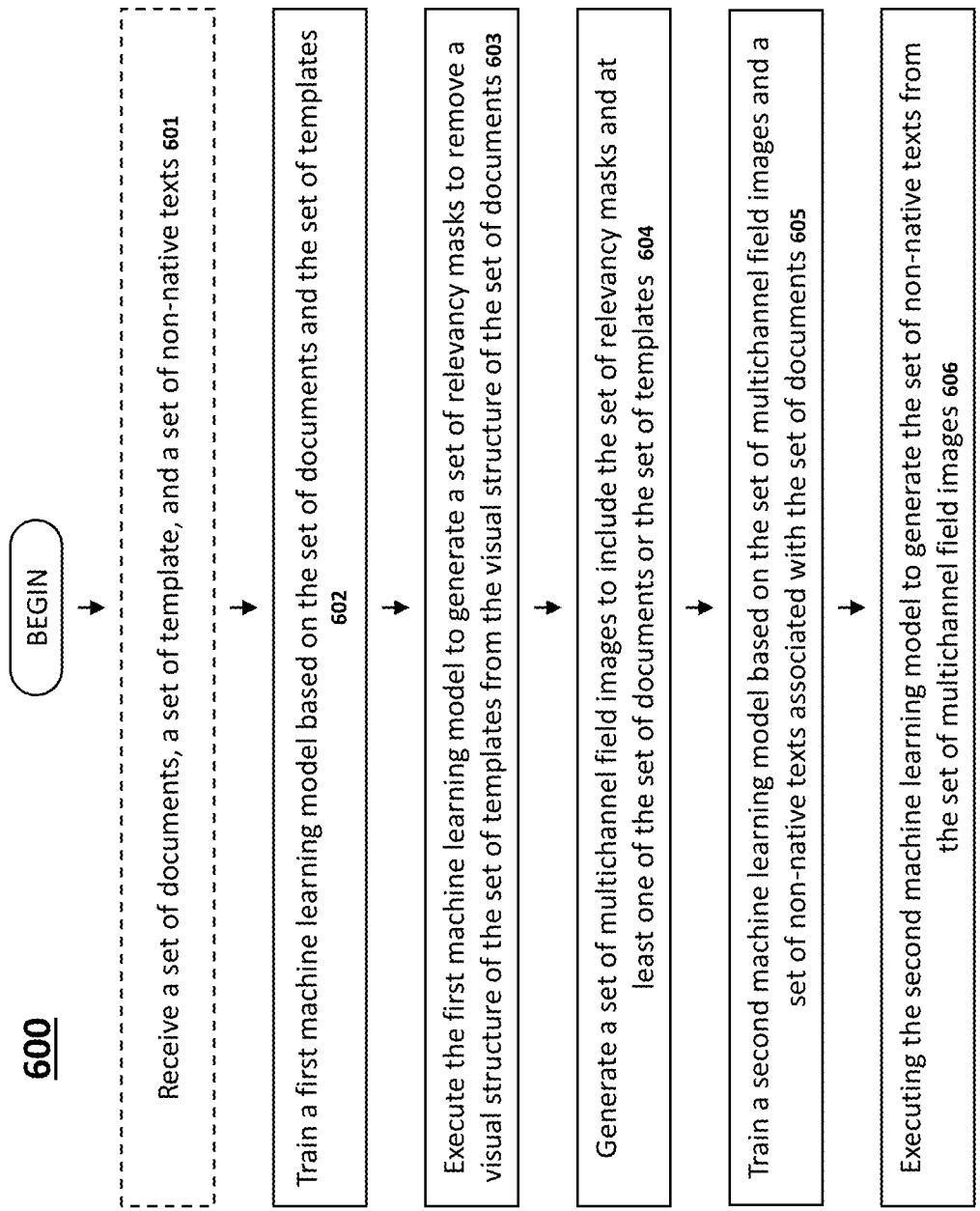

FIG. 6 is a flowchart illustrating a method for generating a non-native text from a document image, according to an embodiment.

DETAILED DESCRIPTION

In some embodiments, a method includes training a first machine learning model based on multiple documents and multiple templates associated with the multiple documents. The method further includes executing the first machine learning model to generate multiple relevancy masks, the multiple relevancy masks to remove a visual structure of the multiple templates from a visual structure of the multiple documents. The method further includes generating multiple multichannel field images to include the multiple relevancy masks and at least one of the multiple documents or the multiple templates. The method further includes training a second machine learning model based on the multiple multichannel field images and multiple non-native texts associated with the multiple documents. The method further includes executing the second machine learning model to generate multiple non-native texts from the multiple multichannel field images.

In some embodiments, an apparatus includes a memory and a processor operatively coupled to the memory. The processor can be configured to execute a first program to generate multiple relevancy masks to remove a visual structure of multiple templates from a visual structure of multiple documents. The processor can be configured to generate multiple multi-tuple data, each multi-tuple data from the multiple multi-tuple data includes a relevancy mask and at least a document, a template, or a non-native text. The processor can be configured to execute a second program to generate the non-native text for each multi-tuple data from the multiple multi-tuple data.

In some embodiments, a non-transitory processor-readable medium stores code representing instructions to be executed by a processor. The code includes code to cause the processor to receive multiple documents associated with multiple templates and multiple non-native texts. The code includes code to cause the processor to generate multiple relevancy masks based on the multiple documents or the multiple templates. The code includes code to cause the processor to generate multiple multichannel field images including the multiple relevancy masks and at least one of the multiple documents, the multiple non-native texts, or the multiple templates. The code includes code to cause the processor to execute an optical character recognition (OCR) model to generate the multiple non-native texts from the multiple multichannel field images.

One or more embodiments described herein generally relate to methods and systems for dynamically processing structured and semi-structured documents, and in particular, method, apparatuses, and systems that utilize a multichannel form template with masked context information to increase the efficiency and reliability of machine learning handwriting recognition systems that can differentiate between essential and inconsequential areas of interest and consistently apply recognition to essential areas. Methods and systems for 3-channel dynamic contextual script recognition using neural network image analytics and 4-tuple machine learning are disclosed. In some embodiments, script recognition is vocabulary agnostic, grammar agnostic, and/or semantics agnostic, and can be used to process, for example, logographic, syllabic, alphabetic, abjadic, abugidic, featural, and/or ideographic scripts. Such scripts are also referred to herein as "the non-native texts", in the sense that such scripts are not included in the original document or template but added to the original document or template. For example, a non-native text can be a handwritten text added to a templated form, a typewritten text filled added to a templated form by using a compute device, and/or the like. In some embodiments, the neural network image analytics and/or the 4-tuple machine learning can be used to process non-native contents, in the sense that such non-native contents can include textual and/or non-textual contents that are not included in the original document or template but added to the original document or template. For example, in addition to potential handwritten text or typewritten text added to a templated form, a non-native content can include a signature, an official seal, a photograph, a stamp, and/or the like. Embodiments described herein include systems and methods utilizing multichannel form templates with masked context information to increase the efficiency and reliability of a machine learning handwriting recognition system that differentiates between essential and inconsequential areas of interest and consistently applies recognition to essential areas.

Recognition of handwritten forms with a templated background has consisted of multi-step processes that filter some portion of the form information with the aim to separate out the handwritten elements from the templated form and further analyze and recognize the handwritten elements free of background noise/information intrusion. One such process might be to 1) recognize the form template, also referred to herein as "the template"; 2) align the form image, also referred to herein as "document" or "document image", to the template image; 3) crop each field from the form image to obtain a field image; and 4) recognize text in the field image, also referred to herein as "the non-native content", using a handwriting recognition algorithm. The non-native content can include, for example, handwritings, official seals, signatures, and/or the like.

This approach suffers from several issues. Field images as created in step three still contain parts of the templated form such as bounding boxes, lines, typewritten characters, etc., complicating the separation of the handwritten material from visual material, also referred to herein as "visual structure", present in the form absent the handwriting. Field images are also likely to be limited to bounded areas where handwritten text is expected to be added, but handwritten text may overflow bounded areas and in unpredictable ways. Thus, a field image may have both too much and too little information in it for the recognition system to accurately analyze and output.

Approaches for minimizing background noise from field images, such as Hough transform, can be used for determining and subtracting lines and removing the template image from field image before applying the transcription system to the remaining input, but imprecisely, particularly with noisy scans where background noise has been introduced by the scan and does not exist as part of the original template image and with the creation of additional structured noise by the minimization process itself. No prior existing approach fully eliminates background noise in a field image, and these approaches do not address the issue of handwriting overflow that also hamper traditional attempts to separate handwritten text, also referred to herein as "non-native content", from templated form backgrounds, also referred to herein as "template content".

According to some embodiments, systems of the disclosure implement a multichannel image that allows a handwriting recognition component 548 (see FIG. 5), system, and/or controller 501 to add a visual machine learning component 543, also referred to herein as "the first machine learning model" or "the first program", that recognizes background information/noise and determines what, if any, of the image can be safely disregarded before performing handwriting analysis. This eliminates the problem of both background noise being present in a field image and for handwritten elements that overflow bounded areas unpredictably. This system improves computationally efficiency by combining template, handwriting, and mask into a single, multichannel image which can be used to train a machine learning algorithm in symbol recognition with the resulting output then able to be passed through a transcription component.

Embodiments described herein provide a method and a system for recognizing and transcribing text added to a templated form. In one embodiment, the text may be handwritten. In another embodiment, the text may be printed. In another embodiment, the text may be handprinted.

As illustrated in FIG. 1, in one embodiment, a form image 101 (e.g., a handwritten document, a printed document, a table, a webpage, and/or the like) and template image 102 are compared for homography in image registration 105. In some embodiment, computer vision algorithms can be used to determine keypoints and descriptors, and form and template images are compared for homographically similar features and the form of the perspective transformation between them is returned, if such a transformation exists. If no keypoints or descriptors are identified in the images, an exception can be generated. An example illustrative code snippet of the above process is provided below:

```
def register_np(source, destination,
    target_size=REGISTRATION_DEFAULT_TARGET_
        SIZE,
    num_points=1000, max_iters=1000, crop_pct=0.0):
    images=[source, destination]
    images=[cv2.resize(im, dsize=tuple(reversed(target_size)),
        interpolation=cv2.INTER_AREA)
    for im in images]
    # extract key points and descriptors
    pt1, d1=_compute_desc(images[0], num_points, crop_pct)
    pt2, d2=_compute_desc(images[1], num_points, crop_pct)
    if len(pt1)==0 or len(pt2)==0:
        raise RegistrationException('No image keypoints to match.')
    matches=_match_descriptors(d1, d2)
    threshold=min(images[0].shape[0],
    images[1].shape[0]) // 100
    xform, mask=cv2.findHomography(pt1[matches[:, 0]],
        pt2[matches[:, 1]],
        cv2.RANSAC,
        maxIters=max_iters,
        ransacReprojThreshold=threshold)
    if xform is None:
        raise RegistrationException('No image registration found.')
    return xform
```

In one embodiment, the extracted transformation projection can be used to deskew or "warp" the cropped field image to the cropped templated form to produce a visually accurate overlay that conflates form text on both images. In both images, form text can produce part of a two-channel image such that pixels in both field and template images that relate to visual elements on the templated image will be comparable. Field and templated images can be scaled to equal height and width coordinates and coordinate values can be transformed from relative to absolute. An example illustrative code snippet of the above process is provided below:

```
def _scale_mat(shape1, shape2):
    m=np.identity(3)
    dims=np.array(shape1[:2])/np.array(shape2[:2])
    m[0, 0]=dims[1]
    m[1, 1]=dims[0]
    return m
def warp_image(image, shape, xform,
    xform_shape=REGISTRATION_DEFAULT_TARGET_
        SIZE):
    r=(_scale_mat(shape, xform_shape) @ xform @
    _scale_mat(xform_shape, image.shape))
    cval=int(np.median(image))
    target_shape=tuple(reversed(shape[:2]))
    return cv2.warpPerspective(image, r, target_shape,
        borderValue=cval)
```

In one embodiment, the multichannel image post-warp containing the conflated field and templated images can receive a relevancy mask channel equivalent to the bounding box of information deemed relevant to the recognition system, such as an area where field (handwritten or otherwise) text is likely to appear. In one embodiment, the relevancy mask highlights field text overflow such that predefined templated bounding boxes may fail to capture the area of interest to the transcribing component 545, also referred to herein as "the second program", "the optical character recognition model", "the second machine learning model", or "the OCR model", of the recognition system. In one embodiment, the relevancy mask highlights areas without high interest template features such that a transcribing element of a recognition system without relevancy masks may fail to determine it is of significance. In some embodiments, the relevancy mask can be generated/created procedurally by a mask generator component 547 and/or an operator component/module 546, and/or generated/created via an operator computer user interface 511, and then the generated mask can then be converted into a single-bit channel composed of black or 0 for pixels in the field bounding box and white or 1 for pixels in the context outside the bounding box. In some embodiments, the relevancy mask can be created/generated, and can then be converted into a multi-bit channel composed of one color for pixels in the field bounding box and another color for pixels in the context outside the bounding box. In some embodiments, the relevancy mask can be a procedurally generated relevancy mask. An example illustrative code snippet of the above process is provided below:

```
def generate_relevancy_mask(image_shape, relevancy_bbox):
    """
    Make an image, containing the relevancy_mask
    (black for pixels in the field bounding box and white for
        the pixels in the context/outside the bounding box) for
        a given image size and bbox.
```

Args:
image_shape: the desired np image size
relevancy_bbox: a bbox containing the absolute coordinates of field relative to the image
Returns:
A ndarray image containing the relevancy mask
"""
```
top, left, bottom, right=relevancy bbox # the axes are swapped
mask=np.full(image_shape, fill_value=255, dtype=np.uint8)
mask[left:right, top:bottom]=0
return mask
```

In some embodiments, the addition of a relevancy mask results in an extracted three-channel image with each pixel containing channel information in the forms of 1) the cropped templated image, 2) the relevancy mask, and 3) the cropped field image with field text for transcription. In some embodiments, the resulting multichannel image contains only the templated image and the field image channels. It to be understood that the channels can be implemented in a variety of orders, depending on the embodiment. In some embodiments, the resulting multichannel image contains only the field image and the relevancy mask channels. In some embodiments, the resulting multichannel image contains only the field image and the templated image. An example illustrative code snippet of the above process is provided below:

```
def extract_field(self, field, image, template, abs boxes):
    abs_box=bbox_rel_to_abs(image.size, field['bounding box'])
    if not self.emit_context:
        crop box=abs_box
    else:
        crop box, mask_bbox=compute expanded crop box(image.size, abs_box, abs boxes)
    field['relevancy_bbox']=mask bbox.tolist( )
    field['image']=image.crop(crop_box)
    field['template']=template.crop(crop_box)
    if self.emit context:
        shape=field['image'].size[1], field['image'].size[0]
        np_mask=generate_relevancy_mask(shape, field['relevancy_bbox'])
        field['relevancy mask']=Image.fromarray(np_mask.astype(np.uint8))
    return field
```

In one embodiment, the resulting multichannel image can then be used to train a machine-learning algorithm such that information found on the templated image channel can be disregarded by the transcription element of the recognition system. In some embodiments, the system can also learn to disregard some aspects of the relevancy mask, such as if field text overflows the relevancy mask area.

In one embodiment, a tuple comprising the multichannel image and the expected transcription can then be used to train a handwriting recognition system with a transcription component. In some embodiments, the handwriting recognition system can be a machine learning algorithm, including but not limited to Hybrid DNN-HMM and/or Multidimensional Long Short Term Memory (LSTM) networks with Connectionist Temporal Classification (CTC) loss. In some embodiments, the handwriting recognition system can be a custom machine learning algorithm. In some embodiments, the handwriting recognition system can be and/or include one or more neural networks.

The compound nature of a single multichannel image in combination with training a machine learning system on the multichannel image has significantly improved the efficiency of the disclosed computed transcription over existing transcription services, eliminating the need for the existing complex, multi-step processes, that in some instances require numerous user interactions and multiple algorithmic aspects to attempt to clean templated images of background noise/information prior to the performance of transcription. An example illustrative code snippet of the above process is provided below:

```
def train(self):
    with self.data_provider.data_loader('train') as self.train_data_loader
        self.train_data_iter = iter(self.train_data_loader)
        self.train_timestamp = time( )
        for train_step in range(self.max_steps):
            self._do_train_step(train_step)
            if train_step > 0 and train step % self.validation_frequency == 0:
                validation_loss = self._do_validation(train_step)
                self.lr_scheduler.step(validation_loss)
            if train_step > 0 and train_step % self.save_model_steps == 0:
                self.model.save(join(self.model_dir, 'model.ckpt-{}'.format(train_step)))
def _do_train_step(self, train_step):
    features, targets = self._move_to_device(self._get_next_batch( ))
    self.optimizer.zero_grad( )
    predictions = self.model(features, 'train')
    loss = self.model.calculate_loss(predictions, targets, self.train_metrics, 'train')
    loss.backward( )
    self.optimizer.step( )
    if train_step > 0 and train_step % self.train_log_frequency == 0:
        metric_values = {name: metric.compute( ) for name, metric in self.train_metrics.items( )}
        time_delta = time( ) - self. train timestamp
        metric_values['average_time'] = time delta / self.train_log_frequency
        print('Training on step', train_step, metric_values)
        _log_metrics(metric_values, self.train_logger, train_step)
        _reset_metrics(self.train_metrics)
        self._train_timestamp = time( )
```

According to some embodiments, for the purpose of recognizing handwritten forms, the HPR is configured to train a specialized handwriting recognition system where the training data comprises 4-tuples, also referred to herein as "multi-tuple data": (image, template image, target mask, transcription) instead of: (image, transcription), and where: image—the image containing the content to be recognized; template image—an aligned image of the same zone of an empty template as image; target mask—a digital image that represents a region of interest within the zone represented in the previous two; and transcription—a textual transcription of the content of the field (the supervision signal for training the algorithm). For example, in FIG. 2 and FIG. 3, the first image contains the image to be transcribed and has highlighted region of interest (the target mask) and additionally the algorithm is provided with the same zone cropped from the clean template image. This allows the handwriting recognition model to learn to ignore graphical elements that are present in the template image (even in the presence of noise). In some embodiments, the training set can contain one or more empty field images with correspondingly empty transcription result(s).

Additionally, in some embodiments, the system expands the zone that is provided to the handwriting recognition model in order to be able to capture parts of the handwritten text that ended up outside the field. For the model to be able to learn to distinguish between content inside and outside of the field, the target mask that signals the region of interest for the model can be added, allowing the model to learn to transcribe text that has significant overlap with the region of interest.

It is important to note that the disclosure and embodiments are not limited to handwritten text, and such examples and illustrations are provided because such applications are where the noted problems can be particularly pronounced. The disclosure can apply equally for printed or hand-printed text, and/or the like.

Since the image, template image and mask typically have the same dimensions or can be resized to have the same dimensions they can be concatenated to in a single 3-channel digital image, also referred to herein as "the multichannel field image". Also any of the two enhancements can be applied separately. One can only use a mask and image or only template and image.

According to some embodiments, since the image, template image and mask can have the same dimensions (or can be resized/adjusted/transformed to have the same dimensions), the image, template image and mask can be concatenated to in a single 3-channel digital image. In some embodiments, any of the two enhancements can be applied separately—e.g., one can use only a mask and image, or only a template and image.

As discussed previously, when processing forms, it can be seen that people sometimes write in way such that their handwriting does not entirely fit in the box that was intended to contain handwritten script. This poses a challenge for automatically processing and recognizing handwritten forms, as the field image does not always contain all the information necessary to obtain an accurate transcription. While some approaches for minimizing this issue are to subtract parts of the image—that is, detecting and removing lines (e.g., using a Hough transform) and subtracting the template image before recognition, such approaches are unreliable and imprecise, especially in noisy scans, and even introduce error by creating their own structured noise, such as around line edges. The methods and systems of the disclosure takes a different approach, training a specialized handwriting recognition model that is able to deal with clutter in the image by knowing what that expected background looks like and is able to learn to ignore it.

In some embodiments of the disclosure, the novel methods include bespoke, specialized handwriting models configured for recognition of templated forms by allowing the algorithm(s) to take advantage of the context in which the handwritten text is placed. This substantially increases the accuracy of recognition by allowing the model to learn which visual elements can be safely ignored. Although the increase in accuracy can vary by dataset, at present, all datasets to which the disclosed approach has been applied have shown an increase in accuracy, e.g., 0.01%, 0.02%, 0.03%, 0.04%, 0.05%, 0.06%, 0.07%, 0.08%, 0.09%, 0.10%, 0.15%, 0.2%, 0.25%, 0.3%, 0.35%, 0.4%, 0.45%, 0.5%, 0.55%, 0.6%, 0.65%, 0.7%, 0.75%, 0.8%, 0.85%, 0.9%, 0.95%, 1.0%, 2%, 3%, 4%, 5%, 6%, 7%, 8%, 9%, 10%, or more. As an example, in one evaluation/experiment, the accuracy increased from 71.39% to 72.06%, and the Character Error Rate dropped from 10.62% to 5.30%. Additionally this reduced the sensitivity of the algorithm to badly defined field bounding boxes.

According to some embodiments, the system can include having an operator determine/identify/select the bounding boxes/bounding vertexes of the fields from the form that are to be recognized by the system/components of the system. In some embodiments, the operator is a software component, artificial intelligence/machine learning component, and/or algorithmic/programmatic operator, while in other embodiments, operator communications are digital signals based on received input to a user interface (UI).

In some implementations, only the image of the scanned filled out form field—cropped by the bounding box determined by the operator—is passed. Such an approach requires accurate and detailed bounding box selection, since having any text within the bounding box from the form template (e.g., the text describing what should be written in the field) or being part of neighboring field, would be present in the result provided by the recognition model. Another consideration is that individuals often write outside the specified area when filling out forms, for a variety of reason (e.g. some people use handwriting that results in descenders that lie outside the expected area, or the marking tool (pen/pencil) does not have a detailed or fine point causing large size script, or if the field is too short the text can overflow outside the expected area).

The teachings of the disclosure solve such problems with conflicting constraints by providing a handwriting model having more information. In some implementations, a grayscale image of the text desired to be transcribed can be provided. According to some embodiments, the process is modified by adding one or two additional inputs images (or additional channels in the same image, as they have the same size) that represent the template image and the target mask.

To solve the issue with transcribing text from the form template, the form field template is passed to the image. In some implementations, the process includes where the blank form template is cropped the same way the filled in form is cropped to extract the desired field. In some such embodiments, the scanned form is first aligned with the blank template. Since the form field image and the cropped form template image have the same size, an image having 2 channels is computed (e.g., in the same way a color image has 3 channels—each defining the brightness of the red, green and blue subpixel). The channels of the disclosure, when viewed in isolation, can be the black and white scanned form field image and the black and white blank form field image, aligned to match the scanned form field image. That image can be represented as a multidimensional array with dimensions [height, width, 2], although it is to be understood that different representations (for example, "channels first" or "channels last", e.g., [2, height, width], as expressed in PyTorch) and implementations (e.g., PyTorch with array dimensions [2 or 3, height, width]; TensorFlow with array dimensions [height, width, 2 or 3]; and/or the like) are also within the scope of this disclosure. A handwriting recognition model can be trained/retrained with images, containing text in the blank template, that also appears in the other channel, but the expected transcription had that text missing. Such an approach effectively trained the handwriting recognition model to ignore text and graphical elements present on the blank template, allowing flexibility in and/or relaxing the restrictions/parameters placed on bounding box selection.

To address issues with text not fitting in a selected bounding box, some embodiments have extended crop boundaries, where the crop boundaries are extended by an amount (function) dependent both on the size of the bounding box and the size of the whole page. Results illustrate that having this modification in isolation can result in the same issues as defining a bounding box containing text from neighboring fields. To solve this issue, embodiments of the disclosure include computing a mask: an image with the same size as the crops with extended crop boundaries, but instead of color/light brightness that a mask's pixel values represent whether or not that pixel would be part of the original crop. This helps signal the model which pixels are important, although in some embodiments, the model can learn to ignore that signal for a part of a certain image (e.g., if the text overflows from the original bounding box, the signal that the pixels near the overflowing text are not important can be ignored). An example is illustrated by FIG. 4. After the addition of the mask the input of the model becomes a 3-channel image: one channel for the scanned form field (cropped with extended crop boundaries), one channel for the blank form template filed (cropped the same way as the scanned form field in the first channel) and the mask, and the handwriting recognition model can then be retrained with images in that format. In some embodiments text that should be ignored in the regions of the image that would not be part of the original crop is included in training the model.

Some systems can include an Image Processing (IP) component 541a, a Feature Extraction (FE) component 541b, and a classification component 541c. The image processing component can include image capture (e.g., data from a database, a scanner, a camera, etc.), noise reduction, skew correction, thresholding technique, filtering technique, slant normalization, and/or segmentation components or subcomponents. The feature extraction component 541b can extract and/or determine representative features of individual characters, groups of consecutive characters, and/or words. The classification component 541c can do the classification, for example, where an embodiment system has been trained on sets of known data (e.g., database of known handwritten words or characters coupled with linguistic data, syntax data, dictionary data, etc.) in order to develop the parameters to be used in classifying the imaged word.

In some embodiments, systems can follow a segmentation procedure for segmenting a word image in order to determine the individual characters using mathematical modeling in the classification stage. An over-segmentation procedure based on morphology and linguistic information can be used to translate a 2-D word image into 1-D sequence of sub-character symbols. The imaged word can be segmented such that proper segmentation points (e.g., correct segmentation points of cursive script written words) are captured as a subset of all segmentation points.

Features can be selected to represent the shape information of character and sub-character symbols, and the sequence of symbols can be modeled by one or more recognition algorithms or recognition components, which can include, by way of non-limiting example, Hidden Markov Model (HMM), Variable Duration Hidden Markov Model (VDHMM), and/or the like. Additional details for aspects of character recognition can be found in U.S. Pat. No. 8,005,294, the entirety of which is herein expressly incorporated by reference for all purposes.

Embodiments of the disclosure include machine learning methods that improve the performance of data recognition, and in particular, script/handwriting recognition that addresses the noted disadvantages. The present disclosure provides a method of optimizing neural network machine learning, also referred to herein as "artificial neural networks" or "ANN", for script/handwriting recognition in structured contexts such as forms.

Some embodiments of the disclosure include a pre-processing component 541d and/or step, which can include and/or be associated with one more of the following components/programs/steps: de-skew—aligns scan/image, generally to straighten or align text and/or lines; despeckle—removes positive and negative spots and/or smooths edges; binarization—converts image from color or greyscale to black-and-white (or the like, e.g., 0 and 1), can be performed as a way of separating text or other desired image component from the background; line removal—clean up non-glyph boxes and line; layout analysis/"zoning"—identify columns, paragraphs, captions, etc. as distinct blocks; line and word detection—establishes baseline for word and character shapes, can separate groupings/words; script recognition; character isolation/segmentation; normalize aspect ratio and scale.

Embodiments can use a variety of IR 542 and/or character recognition processes and/or components. Some embodiments use OCR algorithms that provide a ranked list of candidate characters. One method utilizes matrix matching, which involves comparing an image to a stored glyph on a pixel-by-pixel basis; also can utilize pattern matching, pattern recognition, and/or image correlation. Feature extraction methods decompose glyphs into features like lines, line direction, closed loops, and line intersections. A feature extraction component 541b can reduce the dimensionality of the representation and can increase the computational efficiency of the recognition process. Features can be compared with an abstract vector-like representation of a character, which might reduce to one or more glyph prototypes. Computer vision techniques can be used as well, and graphics hardware, such as a GPU 503a, can also be utilized, according to some embodiments (for additional detail, see U.S. Pat. No. 7,219,085, the entirety of which is herein expressly incorporated by reference for all purposes). In some instances, nearest neighbor classifiers, such as by way of non-limiting example, the k-nearest neighbor algorithm, can be utilized to compare image features with stored glyph features and choose the best match. Some embodiments can utilize a two-pass approach to script recognition. The second pass is "adaptive recognition" and can use letter shapes recognized with high confidence on the first pass to recognize better the remaining letters on the second pass, which can be useful for unusual script and/or low-quality images/ scans where there can be distortion/blurred/faded. An OCR result can be stored in the standardized ALTO format, a dedicated XML schema, or any number of other formats, depending on the implementation and application.

Embodiments can utilize post-processing component 541e and/or step. In some embodiments, OCR accuracy is increased by constraining the output by a lexicon. A lexicon can, in some embodiments, be a list of words that are allowed to occur in a document, and could be expansive (such as a dictionary of all words in a language) or targets (a technical lexicon for specific document type or field area).

Additional details elements of the disclosure can be found in the following, each of which is herein expressly incorporated by reference in its entirety: U.S. Pat. Nos. 9,043,349, 9,977,976, 9,390,340, 10,089,390, 10,025,976, 9,659,236, 8,903,799, 9,881,208, 9,129,340, 9,495,620, 9,870,143, 9,633,173, 8,913,285, 6,603,881, U.S. Pat. App. Pub. No. 2005/0114799, U.S. Pat. App. Pub. No. 2018/0329935, U.S. Pat. App. Pub. No. 2018/0204111, and U.S. Pat. App. Pub. No. 2018/0114334.

Embodiments of the disclosure include machine learning algorithms, code, and/or components that improve the performance of data recognition, and in particular, script/handwriting recognition algorithms, components, and/or code that addresses the noted disadvantages. The present disclosure includes methods of optimizing neural network machine learning for script/handwriting recognition in structured contexts including but not limited to forms. Embodiments of the disclosure can include a preprocessor, which can include and/or interact with one more of: a deskewer; a despeckler; a binarizer that converts from color or greyscale to black-and-white and/or 1 and 0; a line remover; a layout analyzer; a line and word detector; a script recognizer; a character isolator/segmentor; scale normalizer; and/or a ratio normalizer.

FIG. 5 shows a block diagram illustrating embodiments of a HPR controller. In this embodiment, the HPR controller 501 can serve to aggregate, process, store, search, serve, identify, instruct, generate, match, and/or facilitate image recognition and neural network enhancement with through various technologies, and/or other related data. The HPR can, for example, be configured such that the various components described herein execute on both one or more servers and/or one or more client devices. Because each component of the system can be distributed, as described below, the servers and clients can perform portions of the program logic assigned to them or portions of the program logic normally assigned to the other.

Users, which can be people and/or other computer systems, depending on the embodiment, can engage information technology systems (e.g., computers) to facilitate information processing. In turn, computers employ processors to process information; such processors 503 may comprise central processing units (CPUs), microcontrollers, microprocessors, etc. as known in the art of computers. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations.

One type of program is a computer operating system, which may be executed by a CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the HPR controller 501 may be connected to and/or communicate with entities such as, but not limited to: one or more users from user input devices 511; peripheral devices 512; an optional cryptographic processor device 528; and/or a communications network 513.

The HPR controller 501 can be based on computer systems that can comprise, but are not limited to, components such as: a computer systemization 502 connected to memory 529.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A computer system 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507. Frequently, although not necessarily, these components are interconnected and/or communicate through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal.

Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols.

The system clock can have a crystal oscillator and generate a base signal through the computer systemization's circuit pathways. The clock can be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization can be referred to as communications. These communicative instructions can further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU can comprise at least one high-speed data processor adequate to execute program components for executing user and/or system-generated requests. The processors themselves can incorporate various specialized processing units, such as, but not limited to: integrated system (bus) controllers, memory management control units, floating point units, and even specialized processing sub-units like graphics processing units, digital signal processing units, and/or the like. Additionally, processors can include internal fast access addressable memory, and be capable of mapping and addressing memory beyond the processor itself; internal memory can include, but is not limited to: fast registers, various levels of cache memory, RAM, ROM, etc. The processor can access this memory through the use of a memory address space that is accessible via instruction address, which the processor can construct and decode allowing it to access a circuit path to a specific memory address space having a memory state. The CPU can be one or more microprocessor(s). The CPU interacts with memory through instruction passing through conductive and/or transportive conduits (e.g., (printed) electronic and/or optic circuits) to execute stored instructions (i.e., program code) according to appropriate data processing techniques. Such instruction passing facilitates communication within the HPR controller and beyond through various interfaces. Should processing requirements dictate a greater amount speed and/or capacity, distributed processors (e.g., Distributed HPR), mainframe, multi-core, parallel, and/or supercomputer architectures can similarly be employed.

Depending on the particular implementation, aspects of the technology disclosed herein can, in some instances, be implemented with one or more microcontroller(s). Also, to implement certain features of the disclosed technology, some feature implementations can utilize embedded components, such as: Application-Specific Integrated Circuit ("ASIC"), Digital Signal Processing ("DSP"), Field Programmable Gate Array ("FPGA"), and/or the like embedded technology. For example, any of the HPR component collection (distributed or otherwise) and/or features can be implemented via the microprocessor and/or via embedded components; e.g., via ASIC, coprocessor, DSP, FPGA, and/or the like. Alternately, some implementations of the HPR can be implemented with embedded components that are configured and used to achieve a variety of features or signal processing.

Depending on the particular implementation, the embedded components can include software solutions, hardware solutions, and/or some combination of both hardware/software solutions. For example, HPR features disclosed herein can be achieved through implementing FPGAs, which are a semiconductor devices containing programmable logic components called "logic blocks", and programmable interconnects. Logic blocks and interconnects can be programmed by the customer or designer, after the FPGA is manufactured, to implement any of the HPR features. A hierarchy of programmable interconnects allow logic blocks to be interconnected as needed by the HPR system designer/administrator, somewhat like a one-chip programmable breadboard. An FPGA's logic blocks can be programmed to perform the operation of basic logic gates such as AND, and XOR, or more complex combinational operators such as decoders or mathematical operations. In at least some FPGAs, the logic blocks also include memory elements, which can be circuit flip-flops or more complete blocks of memory. In some circumstances, the HPR can be developed on regular FPGAs and then migrated into a fixed version that more resembles ASIC implementations. Alternate or coordinating implementations can migrate HPR controller features to a final ASIC instead of or in addition to FPGAs. Depending on the implementation all of the aforementioned embedded components and microprocessors can be considered the "CPU" and/or "processor" for the HPR.

The power source 586 can be of any standard form for powering small electronic circuit board devices such as the following power cells: alkaline, lithium hydride, lithium ion, lithium polymer, nickel cadmium, solar cells, hydrogen fuel cells, and/or the like. Other types of AC or DC power sources can be used as well. The power cell 586 is connected to at least one of the interconnected subsequent components of the HPR thereby providing an electric current to all subsequent components. In one example, the power source 586 is connected to the system bus component 504. In an alternative embodiment, an outside power source 586 is provided through a connection across the I/O interface 508. For example, a universal serial bus (USB) and/or IEEE 1394 connection carries both data and power across the connection and is therefore a suitable source of power.

Interface bus(ses) 507 can accept, connect, and/or communicate to a number of interface adapters, conventionally although not necessarily in the form of adapter cards, such as but not limited to: input output (I/O) interfaces 508, storage interfaces 509, network interfaces 510, and/or the like. Optionally, cryptographic processor interfaces 527 similarly can be connected to the interface bus 507. The interface bus provides for the communications of interface adapters with one another as well as with other components of the computer systemization. Interface adapters are adapted for a compatible interface bus. Interface adapters conventionally connect to the interface bus via a slot architecture.

Storage interfaces 509 can accept, communicate, and/or connect to a number of storage devices such as, but not limited to: storage devices 514, removable disc devices, and/or the like. Storage interfaces can employ appropriate connection protocols.

Network interfaces 510 can accept, communicate, and/or connect to a communications network 513. Through a communications network 513, the HPR controller is accessible through remote clients 533*b* (e.g., computers with web browsers) by users 533*a*. Network interfaces can employ various connection protocols. Should processing requirements dictate a greater amount speed and/or capacity, distributed network controllers (e.g., Distributed HPR), architectures can similarly be employed to pool, load balance, and/or otherwise increase the communicative bandwidth required by the HPR controller. A communications network can be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface can be regarded as a specialized form of an input output interface. Further, multiple network interfaces 510 can be used to engage with various communications network types 513. For example, multiple network interfaces can be employed to allow for the communication over broadcast, multicast, and/or unicast networks.

Input Output interfaces (I/O) 508 can accept, communicate, and/or connect to user input devices 511, peripheral devices 512, cryptographic processor devices 528, and/or the like, using appropriate connection protocols.

An example output device can include a video display, which can comprise a monitor with an interface that accepts signals from a video interface. The video interface can composite information generated by a computer system and generates video signals based on the composited information in a video memory frame.

User input devices 511 can include peripheral devices, such as: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 can be connected and/or communicate to I/O and/or other facilities of the like such as network interfaces, storage interfaces, directly to the interface bus, system bus, the CPU, and/or the like. Peripheral devices can be external, internal and/or part of the HPR controller. Peripheral devices can include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras, scanners, etc.).

It should be noted that although user input devices and peripheral devices can be employed, the HPR controller can be embodied as an embedded, dedicated, and/or monitorless (i.e., headless) device, wherein access would be provided over a network interface connection.

Cryptographic units such as, but not limited to, microcontrollers, processors 526, interfaces 527, and/or devices 528 can be attached, and/or communicate with the HPR controller. Cryptographic units support the authentication of communications from interacting agents. Cryptographic units can also be configured as part of the CPU. Equivalent microcontrollers and/or processors can also be used.

Generally, any mechanization and/or embodiment allowing a processor to affect the storage and/or retrieval of information is regarded as memory 529. However, memory is a fungible technology and resource, thus, any number of memory embodiments can be employed in lieu of or in concert with one another. It is to be understood that the HPR controller and/or a computer systemization can employ various forms of memory 529. For example, a computer systemization can be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 can be any conventional computer system storage. Storage devices can include a drum; a (fixed and/or removable) magnetic disk drive; a magneto-optical drive; an optical drive (i.e., Blueray, CD ROM/RAM/Recordable (R)/Re-Writable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory 529 can contain a collection of program and/or database components and/or data such as, but not limited to: operating system component 515; information server component 516; user interface component 517; HPR database component 519; cryptographic server component 520; mask generator component 547; operator component 546, a transcription component 545; neural net component; Image Recognition (IR) component 542; Handwriting Recognition (HR) component 548; Machine Learning (ML) component 544; Visual Machine Learning (VML) component 543; post-processing component 541*e*; Image Processing (IP) component 541*a*; Feature Extraction (FE) component 541*b*; a classification component 541*c*; pre-processing component 541*d*; and/or the like (i.e., collectively a component collection). The aforementioned components can be incorporated into (e.g., be sub-components of), loaded from, loaded by, or otherwise operatively available to and from the HPR component(s) 535.

Any component can be stored and accessed from the storage devices and/or from storage devices accessible through an interface bus. Although program components such as those in the component collection, typically, are stored in a local storage device 514, they can also be loaded and/or stored in other memory such as: remote "cloud" storage facilities accessible through a communications network; integrated ROM memory; via an FPGA or ASIC implementing component logic; and/or the like.

The operating system component 515 is an executable program component facilitating the operation of the HPR controller. Typically, the operating system facilitates access of I/O, network interfaces, peripheral devices, storage devices, and/or the like. The operating system can be a highly fault tolerant, scalable, and secure system.

An operating system can communicate to and/or with other components in a component collection, including itself, and/or the like. The operating system can communicate with other program components, user interfaces, and/or the like. The operating system, once executed by the CPU, can enable the interaction with communications networks, data, I/O, peripheral devices, program components, memory, user input devices, and/or the like. The operating system can provide communications protocols that allow the HPR controller to communicate with other entities through a communications network 513. Various communication protocols can be used by the HPR controller as a subcarrier transport mechanism for interaction, such as, but not limited to: multicast, TCP/IP, UDP, unicast, and/or the like.

An information server component 516 is a stored program component that is executed by a CPU. The information server can be a conventional Internet information server such as, but not limited to Apache Software Foundation's Apache, Microsoft's Internet Information Server, and/or the like. The information server can allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server can support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like.

The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HPR controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols can be employed across various ports, e.g., FTP communications across port 21, and/or the like. An information server can communicate to and/or with other components in a component collection, including itself, and/or facilities of the like. Most frequently, the information server communicates with the HPR database component 519, operating system component 515, other program components, user interfaces, and/or the like.

Access from the Information Server Component 516 to the HPR database component 519 can be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HPR. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser can generate queries in standard SQL by instantiating a search string with the proper join/select commands based on the tagged text entries, wherein the resulting command is provided over the bridge mechanism to the HPR as a query. Upon generating query results from the query, the results are passed over the bridge mechanism, and can be parsed for formatting and generation of a new results Web page by the bridge mechanism. Such a new results Web page is then provided to the information server, which can supply it to the requesting Web browser. Also, an information server can contain, communicate, generate, obtain, and/or provide program component, system, user, and/or data communications, requests, and/or responses.

Computer interaction interface elements such as check boxes, cursors, menus, scrollers, and windows (collectively and commonly referred to as widgets) facilitate the access, capabilities, operation, and display of data and computer hardware and operating system resources, and status. Operation interfaces are commonly called user interfaces. Graphical user interfaces (GUIs) can be used and provide a baseline and tool for accessing and displaying information graphically to users.

A user interface component 517 is a stored program component that is executed by a CPU. The user interface can be a conventional graphic user interface as provided by, with, and/or atop operating systems and/or operating environments such as already discussed. The user interface can allow for the display, execution, interaction, manipulation, and/or operation of program components and/or system facilities through textual and/or graphical facilities. The user interface provides a facility through which users can affect, interact, and/or operate a computer system. A user interface can communicate to and/or with other components in a component collection, including itself, and/or facilities of the like. Most frequently, the user interface communicates with operating system component 515, other program components, and/or the like. The user interface can contain, communicate, generate, obtain, and/or provide program component, system, user, and/or data communications, requests, and/or responses.

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, can run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component can employ cryptographic techniques such as, but not limited to: digital certificates, digital signatures, dual signatures, enveloping, password access protection, public key management, and/or the like. The cryptographic component can facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like.

Employing such encryption security protocols, the HPR can encrypt some or all incoming and/or outgoing communications, and/or can serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component can provide unique identifiers of content, e.g., employing and MDS hash to obtain a unique signature for a digital audio file. A cryptographic component can communicate to and/or with other components in a component collection, including itself, and/or facilities of the like. The cryptographic component supports encryption schemes allowing for the secure transmission of information across a communications network to enable the HPR component to engage in secure transactions if so desired. The cryptographic component facilitates the secure accessing of resources on the HPR and facilitates the access of secured resources on remote systems; i.e., it can act as a client and/or server of secured resources. Most frequently, the cryptographic component communicates with information server component 516, operating system component 515, other program components, and/or the like. The cryptographic component can contain, communicate, generate, obtain, and/or provide program component, system, user, and/or data communications, requests, and/or responses.

The HPR database component 519 can be embodied in a database and its stored data. The database is a stored program component, which is executed by the CPU; the stored program component portion configuring the CPU to process the stored data. The database can be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HPR database may be implemented using various standard data-structures, such as an array, hash, (linked) list, struct, structured text file (e.g., XML), table, and/or the like. Such data-structures can be stored in memory and/or in (structured) files. In another alternative, an object-oriented database can be used, such as Frontier, ObjectStore, Poet, Zope, and/or the like. Object databases can include a number of object collections that are grouped and/or linked together by common attributes; they can be related to other object collections by some common attributes. Object-oriented databases perform similarly to relational databases with the exception that objects are not just pieces of data but can have other types of capabilities encapsulated within a given object. Also, the database can be implemented as a mix of data structures, objects, and relational structures. Databases can be consolidated and/or distributed in countless variations through standard data processing techniques. Portions of databases, e.g., tables, can be exported and/or imported and thus decentralized and/or integrated.

In one embodiment, the database component 519 includes several tables 519a-c. An image table 519a can include fields such as, but not limited to: image_id, image_tag, image_date, image_mask, image_class, image_device, image_geo, image_transform, and/or the like. A model table 519b can include fields such as, but not limited to: model_id, model_name, model_history, model_type, and/or the like. An tools table 519c can include fields such as, but not limited to: tool_id, tool_name, tool_role, tool_capabilities, tool_server, tool_component, tool_access, and/or the like. More tables. Any of the aforementioned tables can support and/or track multiple entities, accounts, users and/or the like.

In one embodiment, the HPR database component can interact with other database systems. For example, when employing a distributed database system. In such an embodiment, queries and data access by any HPR component can treat the combination of the HPR database component results and results from a second segment in a distributed database system as an integrated database layer. Such a database layer can be accessed as a single database entity, for example through HPR database component 519, by any HPR component.

In one embodiment, user programs can contain various user interface primitives, which can serve to update the HPR. Also, various accounts can require custom database tables depending upon the environments and the types of clients the HPR may need to serve. It should be noted that any unique fields can be designated as a key field throughout. In an alternative embodiment, these tables have been decentralized into their own databases and their respective database controllers (i.e., individual database controllers for each of the above tables). Employing standard data processing techniques, one can further distribute the databases over several computer systemizations and/or storage devices. Similarly, configurations of the decentralized database controllers can be varied by consolidating and/or distributing the various database components 519a-c. The HPR can be configured to keep track of various settings, inputs, and parameters via database controllers.

The HPR database can communicate to and/or with other components in a component collection, including itself, and/or facilities of the like. Most frequently, the HPR database communicates with the HPR component, other program components, and/or the like. The database can contain, retain, and provide information regarding other nodes and data.

The HPR component 535 is a stored program component that is executed by a CPU. In one embodiment, the HPR component incorporates any and/or all combinations of the aspects of the HPR that was discussed in the previous figures. As such, the HPR affects accessing, obtaining and the provision of information, services, transactions, and/or the like across various communications networks. The features and embodiments of the HPR discussed herein increase network efficiency by reducing data transfer requirements the use of more efficient data structures and mechanisms for their transfer and storage. As a consequence, more data can be transferred in less time, and latencies with regard to data processing operations and transactions, are also reduced. In many cases, such reduction in storage, transfer time, bandwidth requirements, latencies, etc., will reduce the capacity and structural infrastructure requirements to support the HPR's features and facilities, and in many cases reduce the costs, energy consumption/requirements, and extend the life of HPR's underlying infrastructure; this has the added benefit of making the HPR more reliable. Similarly, many of the features and mechanisms are designed to be easier for users to use and access, thereby broadening the audience that can enjoy/employ and exploit the feature sets of the HPR; such ease of use also helps to increase the reliability of the HPR. In addition, the feature sets include heightened security as noted via the Cryptographic components 520, 526, 528 and throughout, making access to the features and data more reliable and secure.

The HPR component can generate and/or utilize a multichannel form template with masked context information to increase the efficiency and reliability of machine learning/neural net handwriting recognition systems.

The HPR component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; and/or the like), WebObjects, and/or the like. In one embodiment, the HPR server employs a cryptographic server to encrypt and decrypt communications. The HPR component can communicate to and/or with other components in a component collection, including itself, and/or facilities of the like. Most frequently, the HPR component communicates with the HPR database component 519, operating system component 515, other program components, and/or the like. The HPR can contain, communicate, generate, obtain, and/or provide program component, system, user, and/or data communications, requests, and/or responses.

The structure and/or operation of any of the HPR node controller components can be combined, consolidated, and/or distributed in any number of ways to facilitate development and/or deployment. Similarly, the component collection can be combined in any number of ways to facilitate deployment and/or development. To accomplish this, one can integrate the components into a common code base or in a facility that can dynamically load the components on demand in an integrated fashion.

The component collection can be consolidated and/or distributed in countless variations through standard data processing and/or development techniques. Multiple instances of any one of the program components in the program component collection can be instantiated on a single node, and/or across numerous nodes to improve performance through load-balancing and/or data-processing techniques. Furthermore, single instances can also be distributed across multiple controllers and/or storage devices; e.g., databases. All program component instances and controllers working in concert can do so through standard data processing communication techniques.

The configuration of the HPR controller will depend on the context of system deployment. Factors such as, but not limited to, the budget, capacity, location, and/or use of the underlying hardware resources can affect deployment requirements and configuration. Regardless of if the configuration results in more consolidated and/or integrated program components, results in a more distributed series of program components, and/or results in some combination between a consolidated and distributed configuration, data can be communicated, obtained, and/or provided. Instances of components consolidated into a common code base from the program component collection can communicate, obtain, and/or provide data. This can be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components can be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication can be facilitated through the creation and parsing of a grammar. A grammar can be developed by using development tools such as lex, yacc, XML, and/or the like, which allow for grammar generation and parsing capabilities, which in turn can form the basis of communication messages within and between components.

For example, a grammar can be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" can be inserted into an "http://" post command and then sent. The grammar syntax itself can be presented as structured data that is interpreted and/or otherwise used to generate the parsing mechanism (e.g., a syntax description text file as processed by lex, yacc, etc.). Also, once the parsing mechanism is generated and/or instantiated, it itself can process and/or parse structured data such as, but not limited to: character (e.g., tab) delineated text, HTML, structured text streams, XML, and/or the like structured data. Further, the parsing grammar can be used beyond message parsing, but can also be used to parse: databases, data collections, data stores, structured data, and/or the like. Again, the desired configuration will depend upon the context, environment, and requirements of system deployment.

FIG. 6 is a flowchart illustrating a method 600 for generating a non-native text from a document image, according to an embodiment. As shown in FIG. 6, the method 600 optionally include, at 601, receiving a set of documents, a set of templates, and a set of non-native texts. The method 600 further includes, at 602, training a first machine learning model based on the set of documents and the set of templates. The method 600 further includes, at 603, executing the first machine learning model to generate a set of relevancy masks to remove a visual structure of the set of templates from a visual structure of the set of documents. The method 600 further includes, at 604, generating a set of multichannel field images to include the set of relevancy masks and at least one of the set of documents or the set of templates. The method 600 further includes, at 605, training a second machine learning model based on the set of multichannel field images and a set of non-native texts associated with the set of documents. The method 600 further includes, at 606, executing the second machine learning model to generate the set of non-native texts from the set of multichannel field images.

In some embodiments, a method includes receiving a set of documents associated with a set of templates and a set of non-native texts. Optionally, the method can include training a first machine learning model based on the set of documents and the set of templates. The method includes generating a set of relevancy masks based on the set of documents or the set of templates. Generating the set of relevancy masks can be performed by executing the first machine learning model or a first set of procedural programs. The method includes generating a set of multichannel field images including the set of relevancy masks and at least one of the set of templates or the set of non-native texts. The method can optionally include training an OCR model based on the set of multichannel field images and the set of non-native texts. The method of includes executing the OCR model to generate a set of non-native texts from the set of multichannel field images. The step of generating the set of non-native texts from the set of multichannel field images can be performed by the executing the OCR model or a second set of procedural programs. The second set of procedural program can include, for example, a pattern matching program, a pattern recognition program, an image correlation program, a classifier program, and/or the like.

In order to address various issues and advance the art, the entirety of this application (including the Cover Page, Title, Headings, Background, Summary, Brief Description of the Drawings, Detailed Description, Claims, Abstract, Figures, Appendices, and otherwise) shows, by way of illustration, various embodiments in which the claimed innovations can be practiced. The advantages and features of the application are of a representative sample of embodiments only, and are not exhaustive and/or exclusive. They are presented to assist in understanding and teach the claimed principles.

It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments can be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various inventive concepts can be embodied as one or more methods, of which at least one example has been provided. The acts performed as part of the method can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently claimed. Applicant reserves all rights in those unclaimed innovations including the right to claim such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
   executing a first machine learning model to generate a plurality of relevancy masks, the plurality of relevancy masks to remove a visual structure of the plurality of templates from a visual structure of the plurality of documents;
   generating a plurality of multichannel field images to include the plurality of relevancy masks and at least one of a plurality of documents or the plurality of templates;
   training a second machine learning model based on the plurality of multichannel field images; and
   executing the second machine learning model to generate the plurality of non-native texts from the plurality of multichannel field images.

2. The method of claim 1, further comprising:
   executing the first machine learning model to separate a non-native content of a document from a template content of the document; and
   executing the second machine learning to generate a non-native text from the non-native content.

3. The method of claim 1, further comprising:
   preparing a plurality of prepared documents based on at least one of an image processing technique, a noise reduction technique, a skew correction technique, a normalization technique, a thresholding technique, a filtering technique, or a segmentation technique,
   the plurality of documents associated with the plurality of prepared documents.

4. The method of claim 1, wherein the plurality of multichannel field images are a plurality of 3-channel field images and associate each document from the plurality of documents to a template from the plurality of templates and a relevancy mask from the plurality of relevancy masks.

5. The method of claim 1, wherein each document from the plurality of documents includes an indication of at least one of a document image, a handwritten document, a printed document, a table, or a webpage.

6. The method of claim 1, wherein at least one of the first machine learning model or the second machine learning model is an artificial neural network (ANN) model.

7. The method of claim 1, wherein at least one of the first machine learning model or the second machine learning model is a Deep Neural Network-Hidden Markov Model (DNN-HMM).

8. The method of claim 1, wherein at least one of the first machine learning model or the second machine learning model is a Long Term Short Term Memory network with Connectionist Temporal Classification (LSTM-CTC) model.

9. A method, comprising:
   executing the first machine learning model to separate a non-native content of a document from a template content of the document;
   generating a plurality of multichannel field images to include the non-native content of the document;
   training a second machine learning model based on the plurality of multichannel field images; and
   executing the second machine learning model to generate a non-native text based on the plurality of multichannel field images.

10. The method of claim 9, further comprising:
    preparing a plurality of prepared documents based on at least one of an image processing technique, a noise reduction technique, a skew correction technique, a normalization technique, a thresholding technique, a filtering technique, or a segmentation technique,
    the plurality of prepared documents associate with a plurality of documents used to train the first machine learning model.

11. The method of claim 9, wherein:
    a plurality of documents is used to train the first machine learning model,
    the plurality of multichannel field images are a plurality of 3-channel field images and associate each document from the plurality of documents to a template from the plurality of templates.

12. The method of claim 9, wherein:
    a plurality of documents is used to train the first machine learning model, each document from the plurality of documents includes an indication of at least one of a document image, a handwritten document, a printed document, a table, or a webpage.

13. The method of claim 9, wherein at least one of the first machine learning model or the second machine learning model is an artificial neural network (ANN) model.

14. The method of claim 9, wherein at least one of the first machine learning model or the second machine learning model is a Deep Neural Network-Hidden Markov Model (DNN-HMM).

15. The method of claim 9, wherein at least one of the first machine learning model or the second machine learning model is a Long Term Short Term Memory network with Connectionist Temporal Classification (LSTM-CTC) model.

* * * * *